United States Patent
Koskimies et al.

(10) Patent No.: US 10,893,056 B2
(45) Date of Patent: Jan. 12, 2021

(54) MESSAGE VERIFICATION

(71) Applicant: Nokia Technologies Oy, Espoo (FI)

(72) Inventors: Olli Oskari Koskimies, Helsinki (FI); Markus Isomäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 53 days.

(21) Appl. No.: 15/764,006

(22) PCT Filed: Sep. 30, 2015

(86) PCT No.: PCT/FI2015/050647
§ 371 (c)(1),
(2) Date: Mar. 28, 2018

(87) PCT Pub. No.: WO2017/055676
PCT Pub. Date: Apr. 6, 2017

(65) Prior Publication Data
US 2018/0278623 A1 Sep. 27, 2018

(51) Int. Cl.
*H04L 29/06* (2006.01)
*H04L 9/32* (2006.01)
(Continued)

(52) U.S. Cl.
CPC ............ *H04L 63/123* (2013.01); *G06F 21/64* (2013.01); *H04L 9/3239* (2013.01);
(Continued)

(58) Field of Classification Search
CPC ... H04L 63/123; H04L 9/3239; H04L 9/3297; H04L 43/106
(Continued)

(56) References Cited

U.S. PATENT DOCUMENTS

| 614,804 A | 11/1898 | Francis |
| 7,502,860 B1 * | 3/2009 | Champagne ............ H04L 47/10 370/252 |

(Continued)

FOREIGN PATENT DOCUMENTS

| CN | 101005359 A | 7/2007 |
| CN | 101917273 A | 12/2010 |

(Continued)

OTHER PUBLICATIONS

International Search Report and Written Opinion received for corresponding Patent Cooperation Treaty Application No. PCT/FI2015/050647, dated Jan. 27, 2016, 11 pages.

(Continued)

*Primary Examiner* — Kenneth W Chang
*Assistant Examiner* — Gregory A Lane
(74) *Attorney, Agent, or Firm* — Laine IP Oy

(57) ABSTRACT

According to an example aspect of the present invention, there is provided an apparatus comprising at least one processing core configured to obtain, from a timestamp, a truncated timestamp comprising a first number of least significant bits of the timestamp and not comprising at least one most significant bit of the timestamp, to derive a hash value based at least in part on the timestamp, a payload and a secret value, and to compile a first message comprising the truncated timestamp, the payload and, at least in part, the hash value, and a transmitter configured to be directed by the at least one processing core, to transmit the first message toward a recipient.

20 Claims, 6 Drawing Sheets

(51) Int. Cl.
*G06F 21/64* (2013.01)
*H04L 12/26* (2006.01)

(52) U.S. Cl.
CPC ............ *H04L 9/3297* (2013.01); *H04L 29/06* (2013.01); *H04L 43/106* (2013.01); *G06F 2221/2151* (2013.01); *H04L 2209/30* (2013.01)

(58) Field of Classification Search
USPC ........................................................ 713/170
See application file for complete search history.

(56) References Cited

U.S. PATENT DOCUMENTS

| | | | |
|---|---|---|---|
| 8,218,768 | B2 | 7/2012 | Rezaiifar et al. |
| 8,346,059 | B2 * | 1/2013 | Fujinami ............... G11B 27/105 386/241 |
| 2003/0005284 | A1 | 1/2003 | Euchner |
| 2007/0079132 | A1 * | 4/2007 | Tanaka .................. H04L 9/3263 713/178 |
| 2009/0308530 | A1 * | 12/2009 | Massicot ................ G06F 21/31 156/272.8 |
| 2010/0158242 | A1 * | 6/2010 | Asher .................... H04L 9/0643 380/28 |
| 2011/0038594 | A1 | 2/2011 | Symons et al. |
| 2012/0084210 | A1 * | 4/2012 | Farahmand ........ G06Q 20/3226 705/64 |
| 2012/0109912 | A1 * | 5/2012 | Donze .................... H04L 41/12 707/694 |
| 2012/0166800 | A1 | 6/2012 | Massicot et al. |
| 2012/0191724 | A1 | 7/2012 | Tucek et al. |
| 2013/0077641 | A1 * | 3/2013 | Burger, Jr. ............. G08C 17/02 370/474 |
| 2013/0103948 | A1 | 4/2013 | Baig |
| 2013/0301833 | A1 | 11/2013 | Wong |
| 2014/0181933 | A1 * | 6/2014 | Sanjeev .............. H04L 63/0823 726/7 |
| 2014/0237237 | A1 | 8/2014 | Brumley et al. |
| 2014/0337633 | A1 * | 11/2014 | Yang ..................... H04W 12/08 713/178 |

FOREIGN PATENT DOCUMENTS

| | | | |
|---|---|---|---|
| CN | 102395006 A | | 3/2012 |
| GB | 2415574 | * | 12/2005 |
| WO | 2014/121294 A1 | | 8/2014 |

OTHER PUBLICATIONS

Davi et al. "Design rationale of a cross-layer, Trustful Space-Time Protocol for Wireless Sensor Networks" 2015 IEEE 20th Conference on Emerging Technologies & Factory Automation (ETFA). Sep. 8, 2015.
Wang, "Bluetooth Low Energy—Privacy Enhancement for Advertisement", Thesis, Jun. 2014, 93 pages.
Extended European Search Report received for corresponding European Patent Application No. 15905276.0, dated Apr. 24, 2019, 5 pages.
Tsaur et al., "A Secure Smart-Card-based Password Authenticated Key Agreement Scheme in Multi-server Environments", IEEE Second International Conference on Social Computing, Aug. 20-22, 2010, pp. 999-1003.

* cited by examiner

MESSAGE VERIFICATION

RELATED APPLICATION

This application was originally filed as PCT Application No. PCT/FI2015/050647 filed Sep. 30, 2015.

FIELD

The present invention relates to the field of verifying messages, such as, for example, authenticating message origin and/or guarding against replay attacks.

BACKGROUND

In electronic communication, such as wire-line or wireless electronic communication, ensuring message authenticity may be of high importance. For example, when communicating sensitive information, such as information relevant to health, personal finances, personal communication, corporate plans, unreleased corporate financial results or information relating to public safety, message authenticity may be an important requirement. Furthermore, even when communicating only to cause electrically locked doors to open, for example, authentication of packet origin may be important to prevent unauthorized persons from passing through the doors.

To guard against a replay attack, where an attacker records a communicated packet and later provides it, a timestamp may be employed. For example, where an electronically locked door is opened by transmitting a suitable packet, furnishing the packet with a timestamp helps guard against replaying recorded messages, since a replayed message would comprise an old timestamp, enabling both detection of the attempted deception and discarding the replayed packet.

To guard against a forged packet, for example where a recorded packet is modified to make a timestamp comprised therein more recent, communicated packets may comprise hash values. In these cases, a hash may be derived over the contents of a packet, including the timestamp, and a secret shared between the transmitter and recipient. Changing the timestamp would cause the hash to no longer correspond to the contents of the packet, enabling detection of the forgery by re-deriving the hash in the receiver end and comparing the re-derived hash to the hash comprised in the message. An attacker not in possession of the shared secret would not know how to modify the hash value comprised in the recorded packet so as to make it match the changed timestamp.

A hash may be derived using, for example, a cryptographic hash algorithm such as secure hash algorithm 1, SHA-1. SHA-1 outputs a 160-bit hash value as an output.

SUMMARY OF THE INVENTION

The invention is defined by the features of the independent claims. Some specific embodiments are defined in the dependent claims.

According to a first aspect of the present invention, there is provided an apparatus comprising at least one processing core configured to obtain, from a timestamp, a truncated timestamp comprising a first number of least significant bits of the timestamp and not comprising at least one most significant bit of the timestamp, to derive a hash value based at least in part on the timestamp, a payload and a secret value, and to compile a first message comprising the truncated timestamp, the payload and, at least in part, the hash value, and a transmitter configured to be directed by the at least one processing core, to transmit the first message toward a recipient.

Various embodiments of the first aspect may comprise at least one feature from the following bulleted list:
- the at least one processing core is configured to include in the first message a truncated hash value comprising a second number of bits of the hash value and not comprising at least one bit of the hash value
- the apparatus is further configured to process a second message, received in response to the message, the second message comprising a time indication from the recipient of the first message
- the at least one processing core is further configured to compile a third message for transmission to the recipient, the third message comprising a current time kept in the apparatus
- the at least one processing core is further configured to set a current time kept in the apparatus to a value indicated in the time indication comprised in the second message
- the at least one processing core is further configured to ensure the timestamp is greater than a previous timestamp used in compiling a preceding message to the recipient of the first message.

According to a second aspect of the present invention, there is provided an apparatus comprising a receiver configured to receive a first message from a transmitting device, and at least one processing core configured to construct a timestamp by replacing a first number of least significant bits of a time kept in the apparatus with the first number of timestamp bits from the first message, the message not comprising more than the first number of timestamp bits, and to derive a hash value based at least in part on the constructed timestamp, a payload of the first message and a secret value, and to verify the derived hash value is consistent with hash information comprised in the first message.

Various embodiments of the second aspect may comprise at least one feature from the following bulleted list:
- the hash information comprised in the first message is a partial hash value that comprises a second number of bits, and wherein the at least one processing core is configured to verify consistency by checking whether the second number of bits of the hash information match corresponding bits of the derived hash value
- the at least one processing core is configured to verify the constructed timestamp is greater than a previous timestamp associated with a preceding message from the transmitting device
- the at least one processing core is configured to verify the constructed timestamp is not smaller than a previous timestamp associated with a preceding message from the transmitting device
- responsive to a determination the derived hash value is not consistent with the hash information comprised in the first message, the apparatus is configured to transmit a second message toward the transmitting device, the second message comprising an indication of the time kept in the apparatus
- the apparatus is configured to, subsequent to determining the derived hash value is not consistent with the hash information comprised in the first message, receive from the transmitting device an indication of time and to set the time kept in the apparatus to the received indication of time the timestamp is expressed in or derived from integer seconds or integer milliseconds since 00:00:00 Coordinated Universal Time, UTC, Jan. 1, 1970.

According to a third aspect of the present invention, there is provided a method comprising obtaining, from a timestamp, a truncated timestamp comprising a first number of least significant bits of the timestamp and not comprising at least one most significant bit of the timestamp, deriving a hash value based at least in part on the timestamp, a payload and a secret value, compiling a first message comprising the truncated timestamp, the payload and, at least in part, the hash value, and transmitting the first message toward a recipient.

Various embodiments of the third aspect may comprise at least one feature from the preceding bulleted list laid out in connection with the first aspect.

According to a fourth aspect of the present invention, there is provided a method comprising receiving, in an apparatus, a first message from a transmitting device, constructing a timestamp by replacing a first number of least significant bits of a time kept in the apparatus with the first number of timestamp bits from the first message, the message not comprising more than the first number of timestamp bits, deriving a hash value based at least in part on the constructed timestamp, a payload of the first message and a secret value, and verifying the derived hash value is consistent with hash information comprised in the first message.

Various embodiments of the fourth aspect may comprise at least one feature from the preceding bulleted list laid out in connection with the second aspect.

According to a fifth aspect of the present invention, there is provided an apparatus comprising means for obtaining, from a timestamp, a truncated timestamp comprising a first number of least significant bits of the timestamp and not comprising at least one most significant bit of the timestamp, means for deriving a hash value based at least in part on the timestamp, a payload and a secret value, means for compiling a first message comprising the truncated timestamp, the payload and, at least in part, the hash value, and means for transmitting the first message toward a recipient.

According to a sixth aspect of the present invention, there is provided an apparatus comprising means for receiving a first message from a transmitting device, means for constructing a timestamp by replacing a first number of least significant bits of a time kept in the apparatus with the first number of timestamp bits from the first message, the message not comprising more than the first number of timestamp bits, means for deriving a hash value based at least in part on the constructed timestamp, a payload of the first message and a secret value, and means for verifying the derived hash value is consistent with hash information comprised in the first message.

According to a seventh aspect of the present invention, there is provided a non-transitory computer readable medium having stored thereon a set of computer readable instructions that, when executed by at least one processor, cause an apparatus to at least obtain, from a timestamp, a truncated timestamp comprising a first number of least significant bits of the timestamp and not comprising at least one most significant bit of the timestamp, derive a hash value based at least in part on the timestamp, a payload and a secret value, compile a first message comprising the truncated timestamp, the payload and, at least in part, the hash value, and cause transmitting of the first message toward a recipient.

According to an eighth aspect of the present invention, there is provided a non-transitory computer readable medium having stored thereon a set of computer readable instructions that, when executed by at least one processor, cause an apparatus to at least receive, in an apparatus, a first message from a transmitting device, construct a timestamp by replacing a first number of least significant bits of a time kept in the apparatus with the first number of timestamp bits from the first message, the message not comprising more than the first number of timestamp bits, derive a hash value based at least in part on the constructed timestamp, a payload of the first message and a secret value, and verify the derived hash value is consistent with hash information comprised in the first message.

According to a ninth aspect of the present invention, there is provided a computer program configured to cause a method in accordance with at least one of the third and fourth aspects to be performed.

EMBODIMENTS

By including in a message a truncated version of a timestamp instead of a full timestamp, bits may be conserved such that they become usable for other purposes. Likewise, by including in a message a truncated, or partial, hash value instead of a full hash value may conserve bits while maintaining a level of authentication security that is acceptable for a given application. A truncated timestamp may be reconstituted in the receiver end, since during message transmission it is foreseen that only a few least significant bits of the timestamp will change. Therefore it may suffice to only include some least significant bits in the message.

Figure 1:
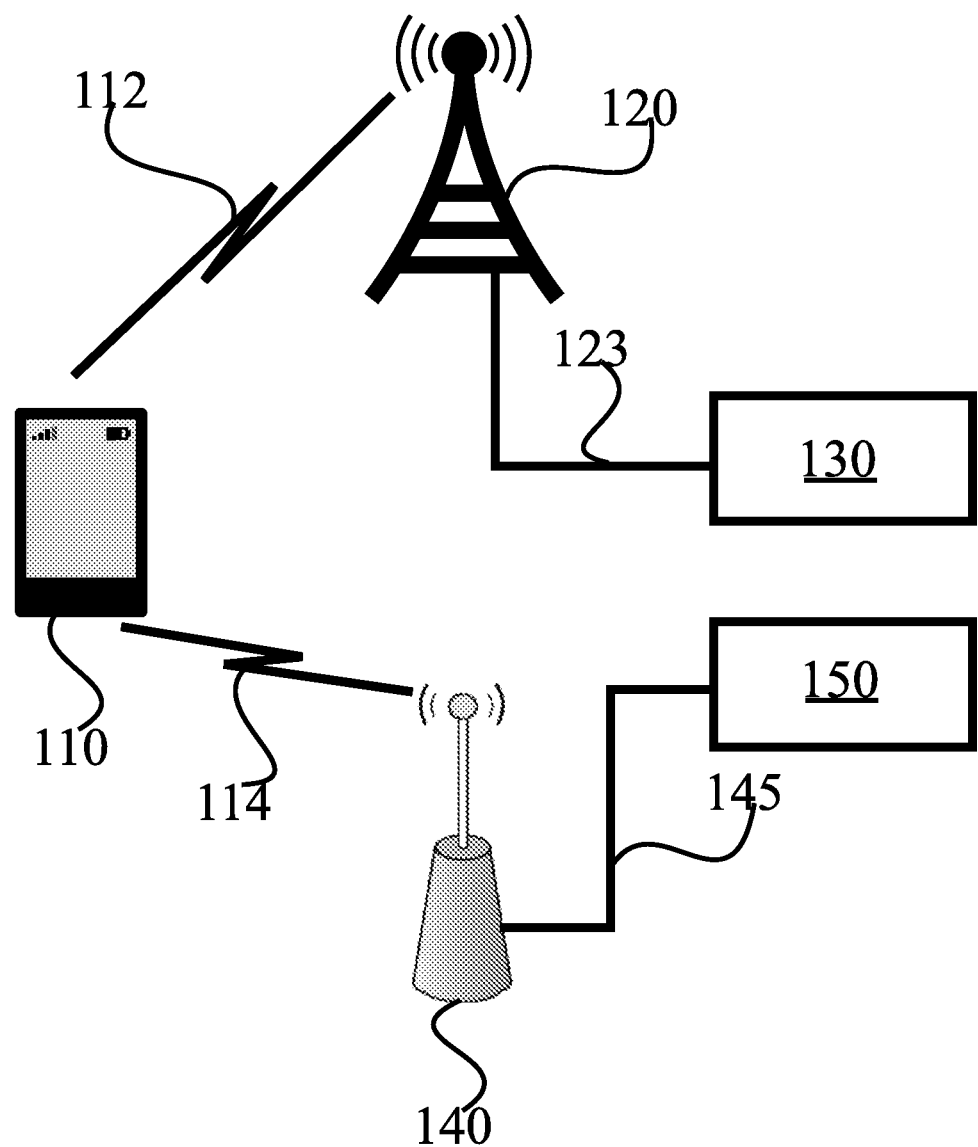
FIG. 1 illustrates a system in accordance with at least some embodiments of the present invention.

FIG. 1 illustrates a system in accordance with at least some embodiments of the present invention. The system of FIG. 1 comprises device 110, which may comprise, for example, an electrical key device, a personal device, a cellular telephone, a smartphone, a phablet device, a tablet computer, a laptop computer, a desktop computer or another kind of suitable device, for example. Device 110 may be configured to transmit messages. Such messages may be formatted according to a predefined scheme, for example, into data structures that comprise one or a plurality of bit fields. The bit fields may be of predetermined lengths, for example 32 bits, 8 bits or 160 bits. The bit fields may be of differing lengths with respect to each other.

Messages transmitted from device 110 may reach their destination via air interface 112 and base station 120, for example, In the illustrated example, base station 120 is arranged to function in accordance with a cellular communication standard, or technology, such as, for example, long term evolution, LTE, wideband code division multiple access, WCDMA, or interim standard 95, IS-95. Air interface 112 is arranged in accordance with a same technology as base station 120. Where transmitted via air interface 112 and base station 120, the messages originating in device 110 may be conveyed to their recipient 130 via connection 123, which may comprise, for example, a wire-line interface such as Ethernet, or an at least in part wireless interface.

Alternatively, or additionally, to messaging via base station 120, device 110 may be arranged to transmit messages via access point 140. In this case, messages are conveyed toward recipient 150 via air interface 114, access point 140 and connection 145. Connection 145 may be wire-line or at least in part wireless. Air interface 114 and access point 140 may be configured to operate in accordance with a non-cellular technology, such as Bluetooth, Bluetooth-low energy, BTLE, wireless local area network, WLAN, or worldwide interoperability for microwave access, WiMAX, for example.

Air interfaces 112 and 114 may be bidirectional, in other words, comprising an uplink arranged to convey information from device 110 to base station 120 or access point 140, and comprising a downlink arranged to convey information toward device 110. Connections 123 and/or 145 may likewise be bidirectional.

Recipient 130 and recipient 150 may, depending on the embodiment, be the same recipient or two distinct recipients. In some embodiments, recipient 130 is integrated in or with base station 120. In some embodiments recipient 150 is integrated in or with access point 140. Recipient 130 and/or recipient 150 may comprise a server, for example, or a control device configured to control a process, such as a door opening mechanism or industrial process, for example. In some embodiments, device 110 is configured to communicate using only one technology. For example, where device 110 comprises an electric key device, it may be configured to communicate with BTLE, only, by sending messages to a control device and receiving responses therefrom. Additionally to, or alternatively to, wireless communication device 110 may be configured to transmit messages using a wire-line connection.

A recipient of a message, such as for example recipient 130 or recipient 140, may be configured to take steps to ensure security of messaging between itself and a transmitter, such as device 110. Ensuring security may comprise at least one of employing encryption to render message contents inaccessible to eavesdroppers, verifying the authenticity of the message and guarding against replay attacks. Verifying the authenticity, or authenticating, a message may comprise enhancing reliability that the message was created by the correct transmitter. Replay attacks comprise attacks wherein the attacker records a transmitted authentic message, for example while it traverses the air interface, and subsequently transmits the recorded message. Since the recorded message is originally authentic, specific measured may need to be taken to ensure the recorded message is not accepted by the recipient.

Encrypting content may comprise providing the content as input to an encryption algorithm, and transmitting encrypted content provided from the encryption algorithm as output. Examples of encryption algorithms are symmetric encryption algorithms and public key encryption algorithms. Examples of symmetric encryption algorithms include triple-DES and advanced encryption standard, AES, while examples of public key encryption algorithms include the RSA and ElGamal algorithms.

Authenticating may comprise verifying an authentication feature of a message. For example, contents of a message may be cryptographically signed using a public key cryptosystem, wherein a private key is used for signing and a corresponding public key is usable in verifying the signature. Alternatively, or additionally, a hash function may be used to derive a hash value, such that contents of the message, and a shared secret, are provided to the hash function, and a hash value is obtained from the hash function as output. The hash function may comprise a cryptographic hash function, for example. The hash value may be included in the message, enabling the recipient to re-derive the hash using message content and the shared secret, to check the sender was in possession of the shared secret by comparing the re-derived hash value to the hash value in the message. Examples of hash functions include SHA-1, SHA-2, SHA-3 and MD5.

Guarding against replay attacks may comprise furnishing the message with a timestamp. A timestamp may comprise an indication of a time when the message is compiled or sent, and verifying the timestamp to guard against replay may comprise comparing the timestamp to a current time available to the recipient. In case the current time is later than the time indicated in the timestamp by more than a threshold time, the timestamp may be considered to fail verification. Since transmitting and receiving the message takes a finite time, and the clocks of the transmitter and recipient may not be perfectly aligned, the timestamp may differ by the threshold time from the current time and still pass verification. In some embodiments, the recipient is configured to reject messages from the same transmitter in case the reconstructed timestamp is not greater than that of the previous message from the same transmitter. An identical timestamp may be an indication of a replayed message.

A full timestamp, expressed as a binary variable, may take at least 4 bytes of space. A byte is eight bits. A typical hash value takes 8 bytes. In total, a timestamp and a hash value may thus take at least 12 bytes in a message.

In case device 110 uses a message format in accordance with a predefined scheme when transmitting, the overall message size may be set and not modifiable by device 110. In case the timestamp and/or hash value can be stored in the message using fewer bits, a larger fraction of the message can be used to communicate the actual contents, rather than security information such as timestamp and hash value. Even where the message size could be changed by device 110, communicating fewer bits consumes less energy and takes less time than communicating more bits, obtaining thereby advantages over communicating more bits.

When re-purposing an existing message format to a new use, including information in the message format that is not originally specified for it may become possible by using fewer bits for timestamp and/or hash value use. For example, where a message format has content that cannot be removed or replaced, and a timestamp and a hash value, using even a few bits less for timestamp and/or hash value use may create a few bits' space usable for a new purpose, such as, for example a status indicator indicating a state of device 110, or a location of device 110.

Occasionally a message may be left unsent in case its essential contents may be transmitted in another message. For example, if instead of periodically transmitting sensor data and positioning data in separate messages, the sensor data can be included in positioning messages, a significant energy saving may be obtained. This may be made possible by decreasing the number of bits used for timestamp and/or hash value use in the positioning messages. Such a modification is particularly useful where the sensor and positioning data are needed at the same frequency, or periodicity.

To conserve bits in transmitting a timestamp, a truncated timestamp may be derived, the truncated timestamp comprising a subset of bits of the full timestamp and not the full timestamp. In detail, the truncated timestamp may comprise a set of least significant bits of the full timestamp. Likewise, the hash value may be truncated, such that a truncated hash value is derived, the truncated hash value comprising a subset of bits of the full, un-truncated hash value. The truncated hash value may comprise a subset of most significant bits, least significant bits or a generic, pre-determined subset of bits. A full hash value and a truncated hash value are examples of as hash information.

Since the current time available to the recipient is expected to be relatively close to the time the transmitter employed when compiling the message, and the clock of the transmitter and the recipient are expected to be relatively well aligned with each other, a valid message is expected to arrive at the recipient such that the current time available to the recipient differs from the time used by the transmitter only slightly, in other words, only as it relates to the least significant bits. Therefore, the recipient may reconstruct the original, full timestamp used by the transmitter from the truncated timestamp present in the message by first taking a timestamp in accordance with the current time available to the recipient, and then replacing the least significant bits thereof with the truncated timestamp from the message. The reconstructed timestamp may thereafter be used in verifying the timestamp and/or the message in general. The number of bits present in the truncated timestamp determines how far the clocks of the transmitter and recipient may deviate from each other, before the reconstructed timestamp is no longer correct. When creating the timestamp, an initial indication of time may be divided, for example by 10, to enable incrementing the timestamp for each transmitted message.

To verify the hash information in the message, the recipient may re-derive the hash value based on the message content and the shared secret. When re-deriving the hash value, the recipient may employ the reconstructed timestamp instead of the truncated timestamp. In case the hash information in the message is a truncated hash value, the recipient may verify the hash information by checking, whether a subset of bits in the re-derived hash value that corresponds to the truncated hash value matches the hash information in the truncated hash value. The truncated hash value may comprise, for example, five least significant bits and five most significant bits, or every other bit, of the full hash value.

For example, let's assume the transmitter's UNIX time in milliseconds is 1433421463234. UNIX time corresponds to time in milliseconds since 00:00, Jan. 1, 1970. This may be divided by 10, yielding 143342146323. In hexadecimal, that is 21 5F DB 93 13. Let us assume that we assign 12 bits to the truncated timestamp, meaning we can allow up to 2^12*0.010 s=40.960 seconds of clock drift. The 12 least significant bits are, in hexadecimal, 313. The transmitter adds to the message the least significant bits of the timestamp, 313, and a hash value calculated from the timestamp 143342146323, the message contents excluding the least significant byte of the timestamp and the shared secret. If there were, say, 10 bytes, being 80 bits, overall available in the message, we used 12 bits for the timestamp, which means 68 bits can be used for the hash value, which may be truncated. This would be already be 4 bits more than a minimum of 8 bytes, with a significant drop in collision likelihood, the drop exceeding 90%.

The recipient of the message may then reconstruct the transmitter's full timestamp using its own current time and the least significant byte of the timestamp in the message. Let us assume the recipient's current time differs from the transmitter's by being 2.5 seconds more, corresponding to 1433421465734. The recipient in this example also divides its clock time by 10, obtaining 143342146573. In hexadecimal, that is 21 5F DB 94 0D. The recipient replaces the 12 least significant bits in its own timestamp, 40D, with the 12 least significant bits in the message, 313, obtaining 21 5F DB 93 13, which is the full timestamp used by the transmitter when compiling the message. The recipient then calculates the hash value from this timestamp, the message contents, excluding the least significant byte of the timestamp, and the shared secret, and compares the result to the hash value in the message. Since all the values used for calculating the hash are the same, the result matches, and the message is thereby authenticated.

In some embodiments, where maximal compression of the timestamp is sought, the recipient is configured to not require a reconstructed timestamp be strictly greater than that of a preceding message from the same transmitter. The recipient may still require the reconstructed timestamp to not be smaller than that of a preceding message from the same transmitter. By preceding message it may be meant an immediately preceding message in a sequence of messages sent to the recipient from the same transmitter. This may allow replaying messages for a short while, which may be acceptable in certain embodiments. For example, where a door is unlocked, replaying within the same second is not seen as a risk, since the legitimate user could see the attacker try to open the door within the same second.

In some embodiments, a number of bits allocated to a truncated hash value may be chosen dynamically in dependence of security requirements concerning the message. For example, where a lower security requirement applies to a particular message, a shortened truncated hash value may be used, freeing some more bits for message content. In these cases, there is a slightly larger risk that a forged hash value would accidentally be correct, however in light of the lower security requirement this may be acceptable.

In case verification fails, for example responsive to the hash value derived by the recipient not matching the hash value, or truncated hash value, present in the message, a response message may be sent by the recipient to the transmitter, the response message comprising an indication of the time according to the clock of the recipient. The transmitter may then either set it's time to the time indicated in the response message to align the clocks, or, if the transmitter has a master time, transmit an indication of the master time to the recipient to thereby align the clocks. Messages used to align clocks may be transmitted without separate timestamps. Messages used to align clocks may comprise an indication as to the intended receiver of the message, which may comprise a node identity, for example. Such messages may be encrypted, signed and/or provided with hash values derived from the contents to prevent attacks based on clock alignment messaging.

Figure 2:
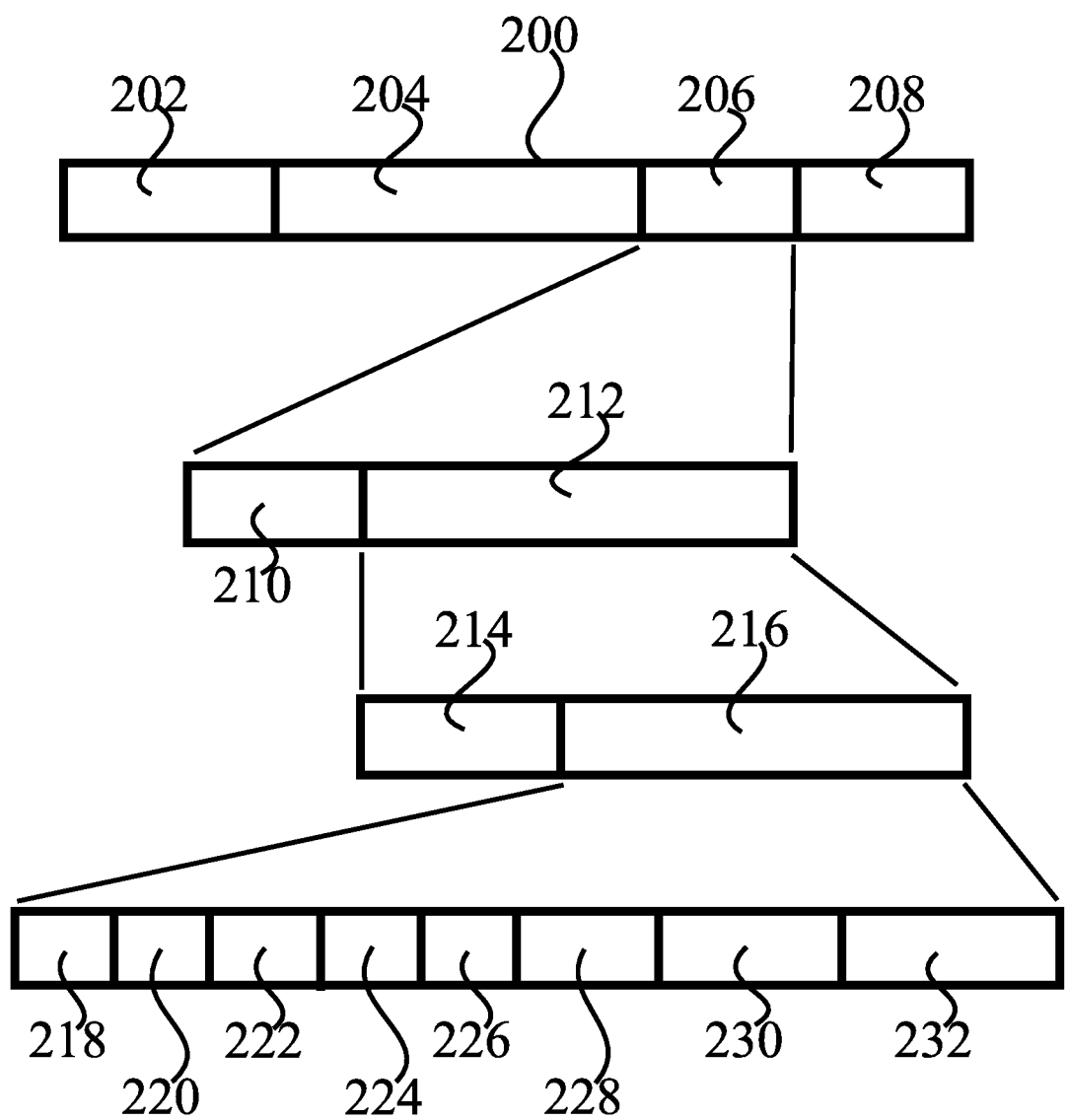
FIG. 2 illustrates a message format in accordance with at least some embodiments of the present invention.

FIG. 2 illustrates a message format in accordance with at least some embodiments of the present invention. The format is that of a Bluetooth low energy advertisement packet 200. The advertisement packet 200 is subdivided into a preamble 202, a sync word 204, a protocol data unit, PDU, 206 and a cyclic redundancy check, CRC, 208. The preamble may be of length 8 bits, the sync word 32 bits and the CRC 24 bits, for example.

The PDU 206 may be subdivided into a header 210 of 16 bits and a payload field 212, for example. Header 210 may comprise a Bluetooth advertisement packet header type, such as ADV_NONCONN_IND, for example. Payload field 212 may be, in turn, subdivided into an AdvA field corresponding to a Bluetooth address of an advertising device of 48 bits, 214, and an advertising data structure 216 of variable length. The advertising data structure 216 may comprise, for example, the following: a length field 218, a type field 220, a company ID 222, a packet ID 224, a data header 226, a data field 228, a bit error checksum 230 and, finally, a positioning data field, DF field, 232. The type field 220 may in this example contain the value 0xFF, indicating a manufacturer specific data structure, for example. The advertising data structure may correspond, for example, to a Nokia high accuracy indoor positioning system. These fields may have the respective lengths of, for example, 8 bits for the length field 218, 8 bits for the type field 220, 16 bits for the company ID 222, 8 bits for the packet ID 224, 8 bits for the data header 226, 32 bits for the data field 228, 8 bits for the checksum field 230 and, finally, 160 bits for the DF field 232. The separate checksum field may be omitted when a hash value is included in the message, since a hash check may be employed to reveal bit errors that occur during transmission, on other words, the hash may effectively act as a checksum.

The DF field, for example, may be shared between security, positioning and/or sensor data where the data may be presented in sufficiently compact form so as to fit within the bit field 232. Including timestamp and/or hash information in the packet to enhance its security characteristics, in a way that conserves bits, further enhances the usability of packets such as advertisement packet 200 for various purposes. The timestamp and/or hash information may be placed in DF field 232, for example, along with other payload data such as positioning or sensor data.

Figure 3:
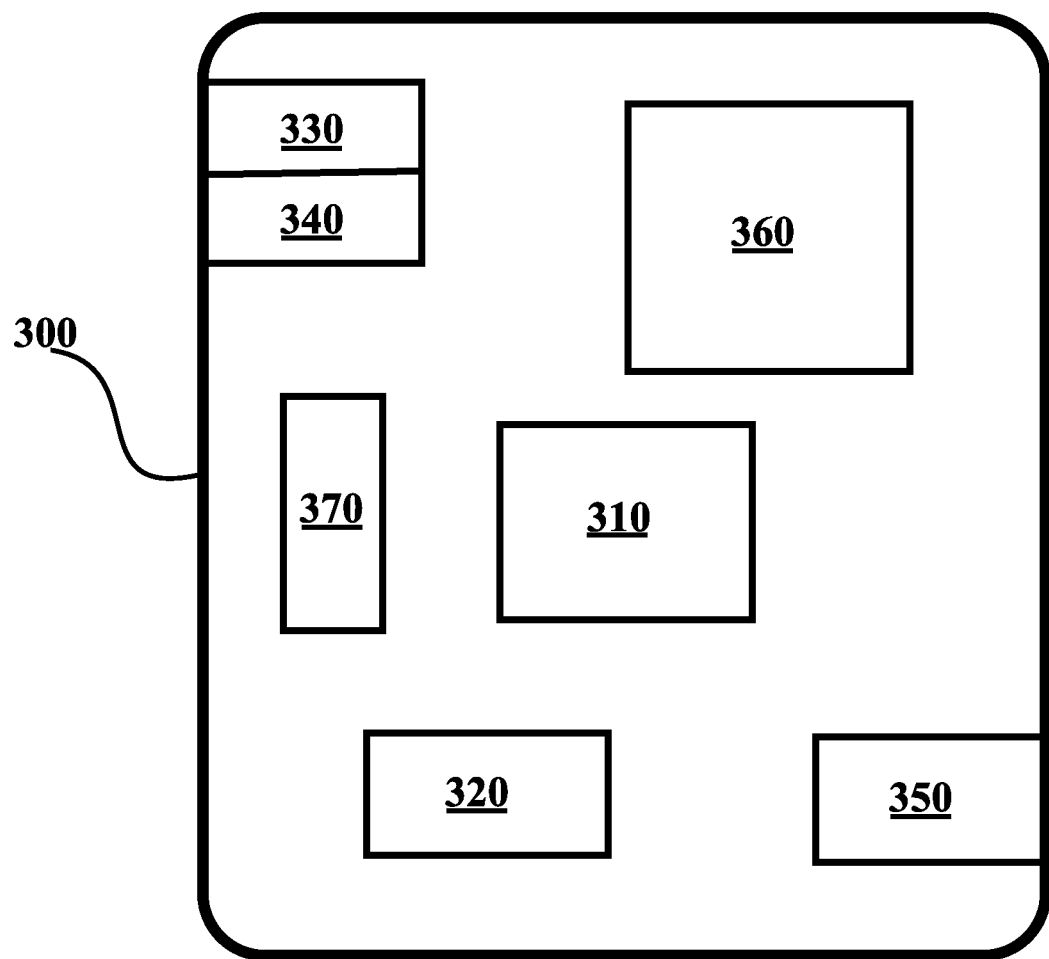
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to operate electronic doors, accept incoming telephone calls, to originate telephone calls or video calls, to browse the Internet, to manage digital files stored in memory 320 or on a cloud accessible via transmitter 330 and receiver 340, or via NFC transceiver 350, and/or to play games, for example.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
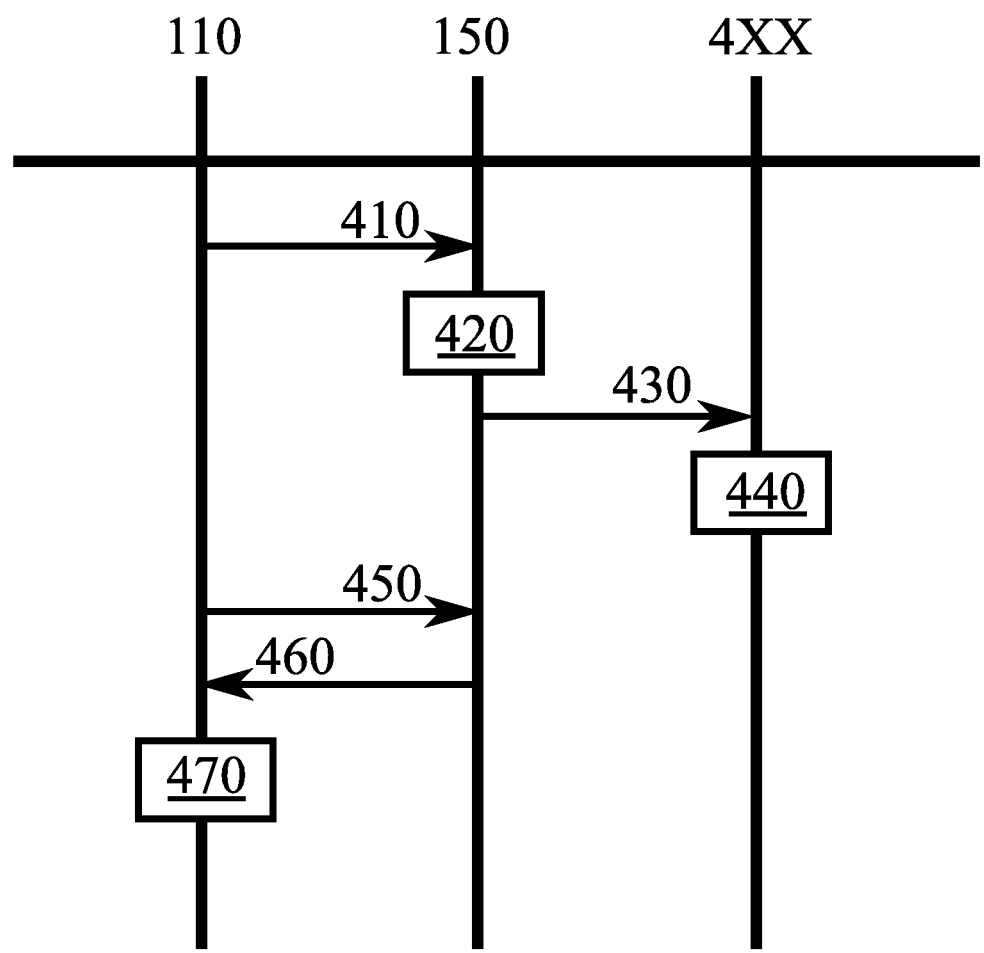
FIG. 4 illustrates signalling in accordance with at least some embodiments of the present invention.

FIG. 4 illustrates signalling in accordance with at least some embodiments of the present invention. On the vertical axes are disposed device 110, recipient 150 and apparatus 4XX. Device 110 and recipient 150 may correspond to like structure as in the system of FIG. 1. Apparatus 4XX may be an apparatus controlled, at least in part, by recipient 150. For example, apparatus 4XX may comprise an electronically locked door or industrial process control device that is arranged to function based, at least in part, on directions received from recipient 150.

Phase 410 comprises transmitting, from device 110, a message to recipient 150. The message may be conveyed via a suitable wired or wireless medium, such as, for example, a universal serial port, USB, cable or a Bluetooth connection. The message may comprise a truncated timestamp and/or a truncated hash value, as laid out above.

In phase 420, recipient 150 verifies the message received in phase 410. Verification in phase 420 may comprise reconstructing the timestamp as described above and checking the reconstructed timestamp is greater than the timestamp of an immediately preceding, that is, the previous, message from device 110 in a sequence of messages from device 110. In case the timestamp is less than or equal to the immediately preceding timestamp, recipient 150 may reject the message. The verification may further comprise re-deriving a hash value from the contents of the message and a secret shared with device 110. When re-deriving the hash value, the reconstructed timestamp may be used instead of the truncated timestamp received in the message. It may then be checked, whether the re-derived hash value is consistent with the hash value or truncated hash value comprised in the received message. In case the hash is successfully verified, recipient 150 may have good confidence that the message is authentic and not replayed.

Responsive to a successful verification, recipient 150 may, in phase 430, instruct apparatus 4XX to perform an action, which may be an action that device 110 requested in the message of phase 410. Responsively, in phase 440, apparatus 4XX performs the action.

In phase 450, device 110 transmits a second message to recipient 150. The message may have similar content fields as the message transmitted in phase 410. At the time the message of phase 450 is transmitted, the clock of device 110 has drifted with respect to the clock in recipient 150, with the consequence that when the message is verified in recipient 150, the reconstructed timestamp may fail in comparison to the previous timestamp received from device 110, and/or the hash value may fail verification as the timestamp used in re-deriving the hash value in recipient 150 is not the same timestamp as the timestamp used in originally deriving the hash value in device 110.

Responsive to the failure in verification in recipient 150, a message may be dispatched back to device 110, in phase 460, this message comprising an indication of a current time according to a clock of recipient 150. The time of recipient 150 is set as the current time of device 110 in phase 470, thereby aligning the clock of device 110 with that of recipient 150.

Figure 5:
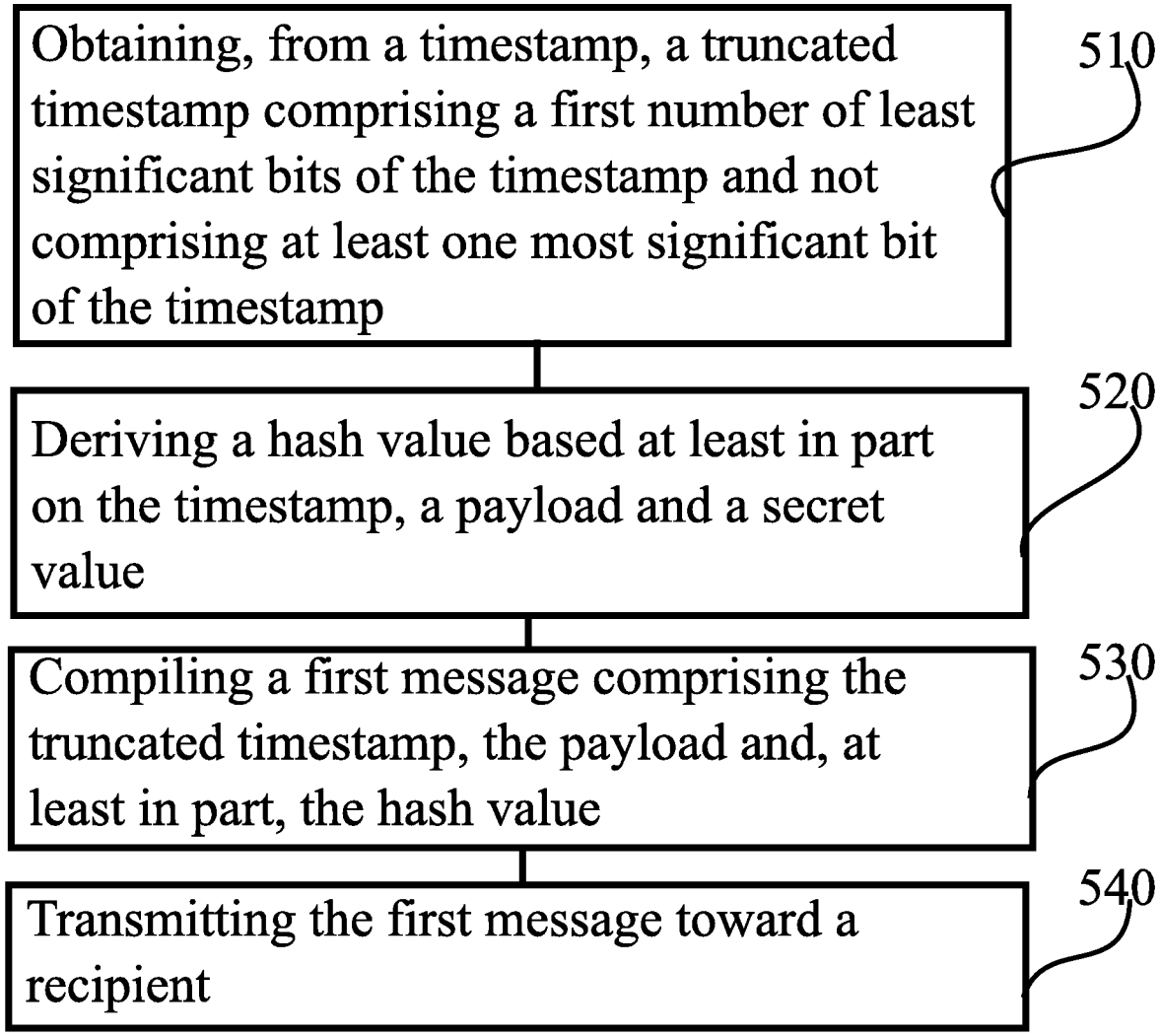
FIG. 5 is a first flow graph of a first method in accordance with at least some embodiments of the present invention.

FIG. 5 is a first flow graph of a first method in accordance with at least some embodiments of the present invention. The phases of the first method may be performed in device 110, for example, or in a control device configured to control the functioning of device 110, when implanted therein.

Phase 510 comprises obtaining, from a timestamp, a truncated timestamp comprising a first number of least significant bits of the timestamp and not comprising at least one most significant bit of the timestamp. The timestamp from which the truncated timestamp is obtained may be seen as a full timestamp. The most significant bits may be understood to comprise the more significant half of bits comprised in the timestamp. Phase 520 comprises deriving a hash value based at least in part on the timestamp, a payload and a secret value. The timestamp used in deriving the hash value may be the full timestamp. Phase 530 comprises compiling a first message comprising the truncated timestamp, the payload and, at least in part, the hash value. Finally, phase 540 comprises transmitting the first message toward a recipient.

Figure 6:
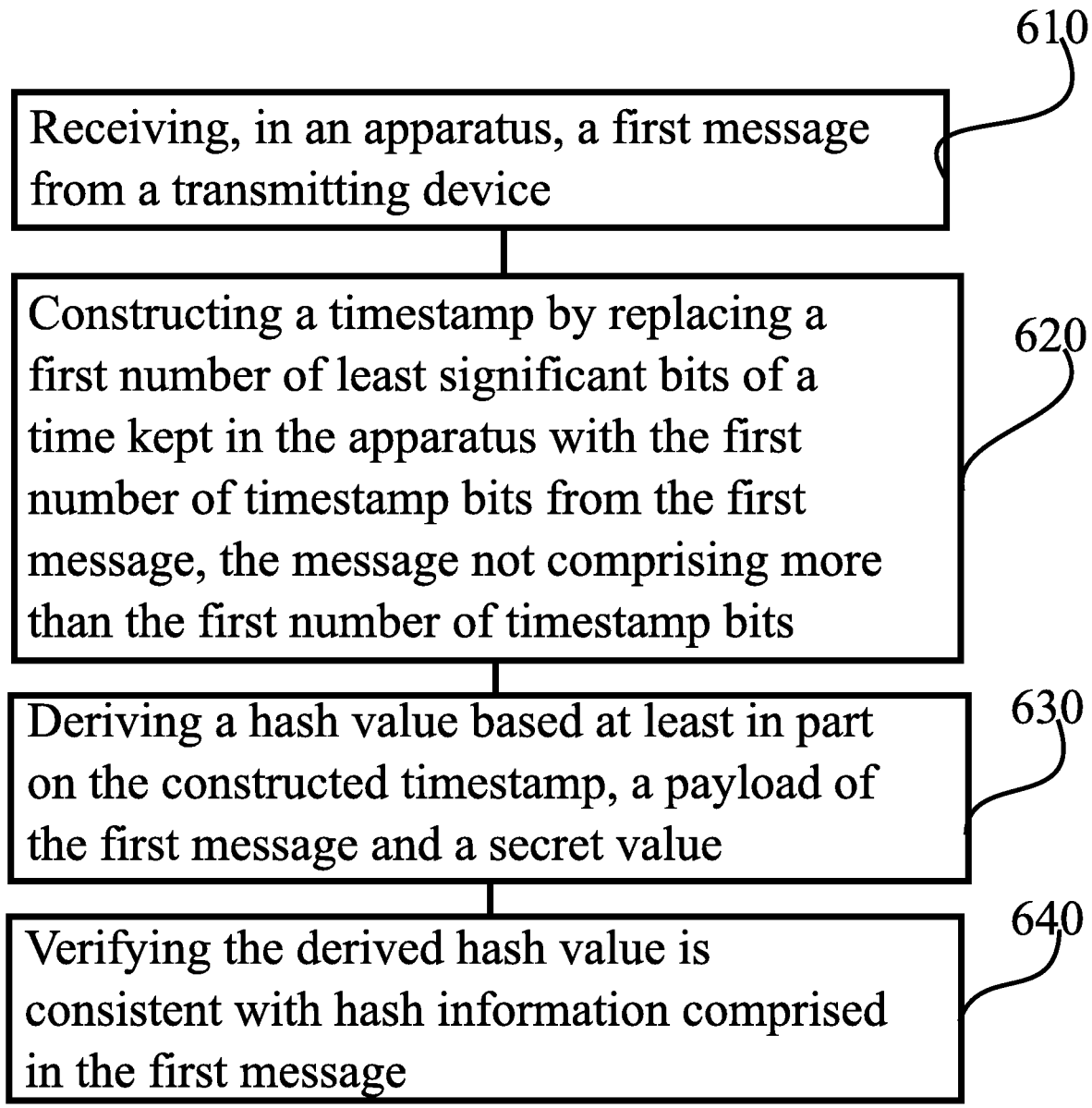
FIG. 6 is a second flow graph of a second method in accordance with at least some embodiments of the present invention.

FIG. 6 is a second flow graph of a second method in accordance with at least some embodiments of the present invention. The phases of the first method may be performed in a recipient device, for example, or in a control device configured to control the functioning of a recipient device, when implanted therein.

Phase 610 comprises receiving, in an apparatus, a first message from a transmitting device. Phase 620 comprises constructing a timestamp by replacing a first number of least significant bits of a time kept in the apparatus with the first number of timestamp bits from the first message, the message not comprising more than the first number of timestamp bits. Phase 630 comprises deriving a hash value based at least in part on the constructed timestamp, a payload of the first message and a secret value. Finally, phase 640 comprises verifying the derived hash value is consistent with hash information comprised in the first message It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in messaging and message verification and reliability.

ACRONYMS LIST

AAA Definition
BTLE Bluetooth-low energy
IS-95 interim standard 95
LTE long term evolution
PDU protocol data unit
SHA-1 secure hash algorithm 1
USB universal serial port
WiMAX worldwide interoperability for microwave access
WLAN wireless local area network
WCDMA wideband code division multiple access

REFERENCE SIGNS LIST

| | |
|---|---|
| 110 | Device |
| 120 | Base station |
| 130 | Recipient |
| 140 | Access point |
| 150 | Recipient |

-continued

REFERENCE SIGNS LIST

| | |
|---|---|
| 112 and 114 | air interfaces |
| 123 and 145 | connections |
| 200 | Bluetooth low energy advertisement packet (FIG. 2) |
| 202-232 | Fields comprised in Bluetooth low energy advertisement packet 200 |
| 300-370 | Structure illustrated in FIG. 3 |
| 410-470 | Phases of the signalling process illustrated in FIG. 4 |
| 510-540 | Phases of the method illustrated in FIG. 5 |
| 610-640 | Phases of the method illustrated in FIG. 6 |

The invention claimed is:

1. An apparatus comprising:
   at least one processor; and
   at least one memory including computer program code for one or more programs, the at least one memory and the computer program code configured to, with the at least one processor, cause the apparatus to perform at least the following:
      obtain, from a timestamp, a truncated timestamp comprising a first number of least significant bits of the timestamp and not comprising at least one most significant bit of the timestamp, to derive a hash value based at least in part on the timestamp, a payload and a secret value, and to compile a first message comprising the truncated timestamp, the payload and, at least in part, the hash value, and
      transmit the first message toward a recipient.

2. The apparatus according to claim 1, wherein the at least one processor is configured to include in the first message a truncated hash value comprising a second number of bits of the hash value and not comprising at least one bit of the hash value.

3. The apparatus according to claim 1, wherein the apparatus is further configured to process a second message, received in response to the message, the second message comprising a time indication from the recipient of the first message.

4. The apparatus according to claim 3, wherein the at least one processor is further configured to compile a third message for transmission to the recipient, the third message comprising a current time kept in the apparatus.

5. The apparatus according to claim 3, wherein the at least one processor is further configured to set a current time kept in the apparatus to a value indicated in the time indication comprised in the second message.

6. The apparatus according to claim 1, wherein the at least one processor is further configured to ensure the timestamp is greater than a previous timestamp used in compiling a preceding message to the recipient of the first message.

7. An apparatus comprising:
   at least one processor; and
   at least one memory including computer program code for one or more programs, the at least one memory and the computer program code configured to, with the at least one processor, cause the apparatus to perform at least the following:
      receive a first message from a transmitting device, and construct a timestamp by replacing a first number of least significant bits of a time kept in the apparatus with the first number of timestamp bits from the first message, the message not comprising more than the first number of timestamp bits, and to derive a hash value based at least in part on the constructed timestamp, a payload of the first message and a secret value, and to verify the derived hash value is consistent with hash information comprised in the first message.

8. The apparatus according to claim 7, wherein the hash information comprised in the first message is a partial hash value that comprises a second number of bits, and wherein the at least one processing core is configured to verify consistency by checking whether the second number of bits of the hash information match corresponding bits of the derived hash value.

9. The apparatus according to claim 7, wherein the at least one processor is configured to verify the constructed timestamp is greater than a previous timestamp associated with a preceding message from the transmitting device.

10. The apparatus according to claim 7, wherein the at least one processor is configured to verify the constructed timestamp is not smaller than a previous timestamp associated with a preceding message from the transmitting device.

11. The apparatus according to claim 7, wherein, responsive to a determination the derived hash value is not consistent with the hash information comprised in the first message, the apparatus is configured to transmit a second message toward the transmitting device, the second message comprising an indication of the time kept in the apparatus.

12. The apparatus according to claim 7, wherein, the apparatus is configured to, subsequent to determining the derived hash value is not consistent with the hash information comprised in the first message, receive from the transmitting device an indication of time and to set the time kept in the apparatus to the received indication of time.

13. A method comprising:
obtaining, from a timestamp, a truncated timestamp comprising a first number of least significant bits of the timestamp and not comprising at least one most significant bit of the timestamp;
deriving a hash value based at least in part on the timestamp, a payload and a secret value;
compiling a first message comprising the truncated timestamp, the payload and, at least in part, the hash value, and
transmitting the first message toward a recipient.

14. The method according to claim 13, further comprising including in the first message a truncated hash value comprising a second number of bits of the hash value and not comprising at least one bit of the hash value.

15. The method according to claim 13, further comprising processing a second message received in response to the message, the second message comprising a time indication from the recipient of the first message.

16. The method according to claim 15, further comprising compiling a third message for transmission to the recipient, the third message comprising a current time kept in the apparatus.

17. The method according to claim 15, further comprising setting a current time kept in the apparatus to a value indicated in the time indication comprised in the second message.

18. A method comprising:
receiving, in an apparatus, a first message from a transmitting device;
constructing a timestamp by replacing a first number of least significant bits of a time kept in the apparatus with the first number of timestamp bits from the first message, the message not comprising more than the first number of timestamp bits;
deriving a hash value based at least in part on the constructed timestamp, a payload of the first message and a secret value, and
verifying the derived hash value is consistent with hash information comprised in the first message.

19. The method according to claim 18, wherein the hash information comprised in the first message is a partial hash value that comprises a second number of bits, and wherein verifying the consistency comprises checking whether the second number of bits of the hash information match corresponding bits of the derived hash value.

20. A non-transitory computer readable medium having stored thereon a set of computer readable instructions that, when executed by at least one processor, cause an apparatus to at least:
obtain, from a timestamp, a truncated timestamp comprising a first number of least significant bits of the timestamp and not comprising at least one most significant bit of the timestamp;
derive a hash value based at least in part on the timestamp, a payload and a secret value;
compile a first message comprising the truncated timestamp, the payload and, at least in part, the hash value, and
cause transmitting of the first message toward a recipient.

* * * * *